US012427547B2

(12) United States Patent
Pearson

(10) Patent No.: US 12,427,547 B2
(45) Date of Patent: Sep. 30, 2025

(54) MATERIAL CONVEYOR, SYSTEM AND METHOD FOR THE MOVEMENT OF MATERIAL

(71) Applicant: MMD Design & Consultancy Limited, Somercotes (GB)

(72) Inventor: Christopher Pearson, Laxey (IM)

(73) Assignee: MMD Design & Consultancy Limited, Somercotes (GB)

( * ) Notice: Subject to any disclaimer, the term of this patent is extended or adjusted under 35 U.S.C. 154(b) by 1037 days.

(21) Appl. No.: 17/290,383

(22) PCT Filed: Dec. 11, 2019

(86) PCT No.: PCT/GB2019/053505
§ 371 (c)(1),
(2) Date: Apr. 30, 2021

(87) PCT Pub. No.: WO2020/120957
PCT Pub. Date: Jun. 18, 2020

(65) Prior Publication Data
US 2021/0370354 A1 Dec. 2, 2021

(30) Foreign Application Priority Data
Dec. 14, 2018 (GB) .................................... 1820431

(51) Int. Cl.
*B07C 5/36* (2006.01)
*B07C 5/342* (2006.01)
(Continued)

(52) U.S. Cl.
CPC .............. *B07C 5/36* (2013.01); *B07C 5/3425* (2013.01); *B07C 5/346* (2013.01); *B65G 41/008* (2013.01);
(Continued)

(58) Field of Classification Search
CPC ......... B07C 5/36; B07C 5/3425; B07C 5/346; B65G 41/008; B65G 47/44; B65G 2201/045
(Continued)

(56) References Cited

U.S. PATENT DOCUMENTS 4,702,379 A * 10/1987 Clayton ................. B65G 47/71
209/539
9,186,681 B2 * 11/2015 Cohen .................... B02C 21/026
(Continued)

FOREIGN PATENT DOCUMENTS

| AU | 2018100787 A4 | 7/2018 |
| CN | 101534953 A | 9/2009 |

(Continued)

OTHER PUBLICATIONS

Wich, Roland; International Search Report; PCT/GB2019/053505; dated Jun. 24, 2020; 6 pages.

*Primary Examiner* — Michael Mccullough
*Assistant Examiner* — Jessica L Burkman
(74) *Attorney, Agent, or Firm* — Bradley Arant Boult Cummings LLP

(57) ABSTRACT

A material conveyor apparatus is described comprising a conveyer device having a material receiving end suitable for receiving material such as overburden or mineral at a working site, a material discharge end distal of the material receiving end, and a material transport system disposed between the material receiving end and the discharge end so as in use to cause material received at the material receiving end to be conveyed to the material discharge end; an scanning system comprising a scanning device disposed to scan the material being conveyed to the material discharge end and obtain a response from the material from which the material may be classified at least into two classes comprising at least a waste class and a useable ore class based on the (Continued)

response; a chassis supporting the conveyor device and the scanning device; a transport carriage supporting the chassis and adapted to cause the chassis to be movable across a surface for deployment in use.

24 Claims, 5 Drawing Sheets

(51) Int. Cl.
    *B07C 5/346*         (2006.01)
    *B65G 41/00*         (2006.01)
    *B65G 47/44*         (2006.01)

(52) U.S. Cl.
    CPC ........ *B65G 47/44* (2013.01); *B65G 2201/045* (2013.01)

(58) Field of Classification Search
    USPC .......................................................... 209/589
    See application file for complete search history.

(56) References Cited

U.S. PATENT DOCUMENTS

| | | | |
|---|---|---|---|
| 9,884,346 B2 * | 2/2018 | Bamber | ................ B07C 5/3425 |
| 2003/0079965 A1 | 5/2003 | Moreno | |
| 2009/0236268 A1 | 9/2009 | Shulman | |
| 2009/0314086 A1 | 12/2009 | Djordjevic | |
| 2010/0288603 A1 | 11/2010 | Schafer | |
| 2011/0180638 A1 | 7/2011 | Harding et al. | |
| 2011/0288679 A1 | 11/2011 | Tavakkoli et al. | |
| 2013/0026263 A1 | 1/2013 | Bamber et al. | |
| 2013/0073077 A1 | 3/2013 | Wellwood et al. | |
| 2013/0201481 A1 | 8/2013 | Bamber et al. | |
| 2013/0229510 A1 | 9/2013 | Killmann | |
| 2014/0231215 A1 | 8/2014 | Lowery | |
| 2015/0104629 A1 | 4/2015 | Cao et al. | |
| 2016/0016203 A1 | 1/2016 | Bamber et al. | |
| 2016/0107197 A1 | 4/2016 | Hartmann et al. | |
| 2016/0129823 A1 | 5/2016 | Millsaps, II | |
| 2016/0193610 A1 * | 7/2016 | Mcdevitt | ............... B65G 41/005 198/313 |

FOREIGN PATENT DOCUMENTS

| | | |
|---|---|---|
| CN | 102143900 A | 8/2011 |
| CN | 102892521 A | 1/2013 |
| CN | 103732327 A | 4/2014 |
| CN | 103769375 A | 5/2014 |
| CN | 104105551 A | 10/2014 |
| CN | 106040618 A | 10/2016 |
| DE | 100167 A1 | 11/1973 |
| DE | 20320957 U1 | 7/2005 |
| EP | 0096706 B1 | 2/1988 |
| GB | 202042 A | 8/1923 |
| GB | 1493273 A | 11/1977 |
| GB | 2067924 A | 8/1981 |
| WO | WO-83002071 A1 | 6/1983 |
| WO | WO-9303863 A1 | 3/1993 |
| WO | WO-2006020707 A2 | 2/2006 |
| WO | WO-2008032057 A2 | 3/2008 |

* cited by examiner

MATERIAL CONVEYOR, SYSTEM AND METHOD FOR THE MOVEMENT OF MATERIAL

FIELD OF THE INVENTION

This invention relates to a material conveyer, system and method for the movement of material from a working site. The invention relates in particular to an overburden or mineral conveyer and a system and method of handling overburden or mineral, for example for use in opencast mining. The material conveyor, system and method is additionally adapted for the classification of conveyed material.

BACKGROUND TO THE INVENTION

In mineral operations such as open-cast mining of coal, significant volumes of material need to be handled at and removed from the working site. First, a large volume of material, known as overburden, has to be removed and disposed of before access is gained to the minerals of interest. Then, the minerals of interest need to removed.

For large scale overburden/mineral removal operations, use may be made of excavation machinery such as draglines as the primary load-bearing tools to move material. These machines have been developed on a huge scale.

The use of shovels to load trucks is another commonplace method. The trucks may then be used to transport the dug mineral to a large scale mineral processing plant located elsewhere in the mine. Whilst truck-shovel loading is not necessarily as cost effective as dragline removal per volume of overburden or mineral removed, it offers more flexibility in removal of overburden material or mineral.

Problems associated with truck-shovel loading include those associated with ensuring that an individual truck is loaded fully and efficiently, and those associated with the essentially batch-process nature of filling discrete trucks.

In particular, a process which requires a truck to reverse into position prior to filling, to be filled by a shovel, and then to drive out requires periodic suspension of the shoveling operation when there is no truck in place. A shovel may not be well adapted to distributing the overburden/mineral efficiently in the truck. The relatively large capacity of a shovel, say 100t, and the consequence that relatively few shovel loads that might therefore be sufficient to fill a truck, tend to make it harder to get anywhere towards 100% fill efficiencies.

Each of these factors may tend to mean that truck-shovel loading is relatively inefficient, both in terms of effectiveness of truck fill, and in terms of volume processing rates.

Various apparatus are known to convert a batch input to a more continuous output. For example, it is known to use surge conveyors provided with a material receiving apron suitable for receiving material such as overburden or mineral at a working site, and an endless conveyor disposed between the material receiving apron and a remote discharge end so as to cause material received at the material receiving apron to be conveyed to the material discharge end and be discharged. If the relative capacities of the receiving apron and endless conveyor are appropriately designed, it is possible to convert a batch input to a relatively more continuous output.

Moreover, the use of large trucks to transport unprocessed material to a large scale mineral processing plant located elsewhere in the mine is becoming less and less attractive because of the large amounts of fuel they consume while working and the additional costs of maintenance, for example in relation to tyre wear. As a result it may be desirable in some cases to provide a mobile processing rig that is able to move around the mine as mining proceeds and perform at least some initial processing functions, and in particular a function of sizing the dug mineral to a reduced size suitable for ongoing processing. An example of such a rig was described in WO2008032057.

In order to ensure a maximum throughput of processed mineral it may be desirable to maintain a continuous supply of dug mineral to the mobile processing rig such that the time it spends idle is reduced to a minimum. This may be achieved by configuring the feeder part of the mobile processing rig relative to a typical shovel supply rate such that it functions as a surge conveyor. Alternatively, the whole mobile processing rig may instead be designed to have an overcapacity so that it can handle batch supply from the shovel.

In the context of the present invention, an ore may be considered to be a rock or other solid material from which one or more economically valuable minerals, and in particular metals, can be extracted commercially. Typically, material recovered from a mining or quarrying site exhibits varying levels of such target minerals such as metals. Generally speaking, material from which economically profitable quantities of the target minerals can be recovered might be considered to be economically useful ores, and materials which do not contain such target minerals in economically recoverable quantities might be considered waste. Before onward processing in a target mineral recovery operation, it is generally necessary to separate the economically useful ore from the waste.

Whether in the case of dug mineral or after such initial processing and for example sizing it remains current standard practice to carry all recovered material from a mining or quarrying site which might contain useful ore away from the site to a processing plant where it is sorted and graded for onward processing.

Such material is likely to include higher grade ores with significant recoverable quantities of target minerals, lower grade ores with economically more marginal recoverable quantities of target minerals, and waste materials including uneconomic ores (that is ores without economically recoverable levels of the target mineral) and other waste.

At the processing plant, remote from the mining or quarrying site, the economic ores are processed for recovery of target mineral, and the waste is suitably discarded.

Such a process is inherently wasteful of transport resource, as a potentially large part of the material transported from the mining or quarrying site to the processing plant may end up being discarded as waste. There is thus a general desire to reduce the amount of material that will ultimately be classified as waste because it does not contain economically recoverable quantities of target mineral from the mined product for transport before such mined product is transported to the processing site.

A further complication arises in that the classification of material, at least as between the two broad categories of ore and waste, is subject to variability. In this context, "ore" ultimately means material from which quantities of the target mineral or minerals are present at a level which makes recovery economically sensible, and "waste" includes material where such mineral is not present or is present at below such economically recoverable quantities. Since what constitutes an economically recoverable quantity is subject to a number of variable factors, some of which, in particular economic factors, may constantly change with time, an excessively rigid classification of what is waste to be discarded is not necessarily desirable. A degree of flexibility in the classification of lower ores grade with economically more marginal recoverable quantities of target minerals is desirable.

The present invention aims to address one or both of the foregoing problems in a manner which is additionally compatible with a general desire to maintain an efficient and flexible throughput of mined material, and which in the preferred case is additionally compatible with a system that maximises throughput by providing a continuous supply of dug mineral to a truck loading system whether directly or via a local processing rig such as a mobile sizer.

In a particular case, the present invention aims to offer a solution to the sorting for onward processing of material product from a mining or quarrying operation which includes a range of concentrations of target mineral, including higher grade ores, lower grade economically marginal ores, and waste, which reduces the unnecessary transport of the waste part of the product where possible.

SUMMARY OF THE INVENTION

In accordance with the invention in a first aspect, a material conveyor apparatus is provided for the conveyance of material such as overburden or mineral, the material conveyor apparatus comprising:
  a conveyor device having:
    a material receiving end for example having a material receiving hopper suitable for receiving material such as overburden or mineral at a working site;
    a material discharge end distal of the material receiving end;
    a material transport system disposed between the material receiving end and the discharge end so as in use to cause material received at the material receiving end to be conveyed to the material discharge end;
  a scanning system including a scanning device disposed to scan the material being conveyed to the material discharge end and obtain a response from the material from which the material may be classified at least into two classes comprising at least a waste class and a useable ore class based on the response;
  a chassis supporting the conveyor device and the scanning device;
  a transport carriage supporting the chassis and adapted to cause the chassis to be movable across a surface for deployment in use.

Preferably the scanning system additionally comprises with a classification module in data communication with the scanner to classify the material at least into two classes comprising at least a waste class and a useable ore class based on the response of the scanning device.

The apparatus of the invention is particularly adapted to effect classification of material at or in the vicinity of a mining or quarrying site, in particular in that it lends itself to continuous operation and to ready automation. A key to the invention is that the apparatus is mobile. At least the conveyer device and the scanning device are mounted on the chassis, and a transport carriage supporting the chassis is adapted to cause the mobile apparatus to be movable across a surface for deployment in use. Other elements of the scanning system such as the classification module may also be mounted on the chassis and form part of the mobile apparatus. Alternatively, they may be provided in whole or in part remotely with a suitable data communication link to receive and process the said response from the scanning device and effect the said classification.

The invention comprises a mobile apparatus with at least the dual functionality that it receives material at the receiving end, for example in typical operation from a material shovel having a bucket adapted to pick up material and move the material from a work front, and conveys the same to a material discharge end where it may be discharged to a further transportation means for transport for onward processing for example at a remote site, but that additionally classifies material at least as between a waste class and a useable ore class. On the basis of this classification, different treatment decisions may be made, and for example materials in the respective classes may be differently allocated for onward transportation. Enhanced flexibility is conferred by embodying the feed device and at least the scanning device in a mobile apparatus deployable at the work front.

To achieve this dual functionality, the invention requires at least a conveyer device having a material receiving end, a material discharge end distal of the material receiving end, and a material transport system disposed between the material receiving end and the material discharge end; and further requires a scanning device disposed at a suitable point relative to the conveyer device to scan the material being conveyed to the material discharge end.

The material transport system comprises one or more conveyor arrangements. Any suitable conveying means may be used for each of the conveyor arrangements. Optionally, each conveyor arrangement may comprise an endless conveyer such as an endless belt conveyor. Optionally, each conveyor arrangement may comprise any or all of the following: drive means; control means to control drive parameters including speed of conveyance.

In a possible embodiment the material conveyor apparatus of the first aspect of the invention is a simple single conveyor arrangement, in that the material transport system is configured to cause material received at the material receiving end to be conveyed directly to the material discharge end. In such an embodiment the material transport system for example comprises one or more endless conveyers such as endless belt conveyors disposed to convey material received at the material receiving end directly to the material discharge end.

Alternatively, the material transport system may comprise a plurality of conveyor arrangements successively disposed to convey material received at the material receiving end to the material discharge end.

The material conveyor apparatus may for example be a transport conveyer, an elevating conveyer, a surge conveyer or has a combination of more than one such functionality. For example, the material conveyor apparatus is conformed as a surge conveyor feeder and comprises an endless belt conveyor or apron/plate feeder.

The material conveyor apparatus of the first aspect of the invention may further comprise one or more material processing modules adapted to effect a material processing operation as the material is conveyed from the material receiving end to the material discharge end. The said material processing module or modules may include a breaker or sizer to break material pieces into smaller pieces of a more desired size for onward processing. In such an embodiment the material transport system for example comprises a plurality of conveyor arrangements, each for example comprising one or more endless conveyers such as endless belt conveyors disposed, with the conveyor arrangements being successively disposed to convey material received at the material receiving end via the material processing module or modules to the material discharge end.

The scanning device disposed to scan the material being conveyed to the material discharge end may be suitably juxtaposed relative to the material transport system, and for example suitably positioned in the vicinity of an endless conveyer thereof, to scan the material as it is being conveyed towards the discharge end. In the case where the material conveyor apparatus of the first aspect of the invention comprise one or more material processing modules the scanning device may be positioned suitably relative to such modules to effect a desired classification.

The apparatus of the invention is particularly adapted to effect classification of material via a binary classification into a waste class in which levels of target mineral are below economically recoverable levels, to be rejected from supply for further processing, and a useful ore class in which levels of target mineral are above economically recoverable levels, to be accepted for and passed to further processing. In this case there are exactly two classes comprising waste and useful ore. However, the invention is equally applicable to the classification of material into multiple classes correlated to a level of target mineral within each such class.

The scanning system includes a scanning device adapted to scan the mineral and monitor some response therefrom, being a response selected to be one which characteristically varies depending upon the intended classification. In particular, the response is selected to be one which varies characteristically depending upon the level of one or more target minerals present in the material, and in consequence which varies characteristically relative to the "quality" of the ore, where quality in this context means economically recoverability of the target mineral. In particular, a property is preferably selected which is continuously variable.

The scanning system, and where applicable the classification module of the scanning system, is preferably adapted to classify the material at least into two classes on the basis of predetermined classification demarcations between the said at least two classes, for example based on a variable response as above described, wherein the predetermined demarcations between classes the may be adjustable so as to be subject to alteration by a user from time to time, for example to take account of economic factors such as material prices.

In this way, especially if making use of a scanning device scanning for a continuously variable property, a classification of the material as between different classes and for example the two broad categories of useful ore and waste can be made, and can be made in a manner which in a preferred embodiment allows the demarcation between definitions of the classes, and for example between definitions of useful ore and waste, to be varied with time, for example to take account of economic factors such as material prices.

A suitable scanning device may include one or more signal emitters to emit a signal in the direction of the material as it passes through the scanner and one or more signal detectors to detect a response signal produced by the material following interaction of the emitted signal therewith. In particular, the scanning device may include one or more emitters and one or more detectors of electromagnetic radiation, and for example may include one or more gamma ray emitters and one or more gamma ray detectors.

The scanning system includes a scanning device positioned to scan the material conveyed to the material discharge end and monitor some response therefrom. The scanning device may be positioned directly in the vicinity of the material transport system to scan the material as it is being conveyed to the material discharge end and monitor some response therefrom. Alternatively, the scanning device may be positioned at or beyond the material discharge end to scan the material after it has been conveyed to and beyond the material discharge end and monitor some response therefrom.

Typically, the scanning device may require material to be scanned for a pre-determined acquisition time to obtain a signal.

In a possible more complete embodiment, the material transport system may include a scanning conveyor comprising a first conveyor portion to convey material to and through the scanning system and second conveyor portion to convey the material from the scanning system to a point of delivery, wherein the second conveyor portion is configured to have a combined conveyance speed and length such as to deliver material to the point of delivery after at least a pre-determined acquisition time has elapsed. Where a sorting capability is provided the point of delivery may be a sorter as below described. Where no such capability is provided the point of delivery may be the discharge end of the material transport system.

In a possible arrangement an endless conveyor of the material transport system may be configured to constitute such a first conveyor portion, or such a first conveyor portion and second conveyor portion. In an alternative arrangement a separate scanning conveyor may be provided positioned beyond the material discharge end of the material transport system to receive material directly or indirectly from the material transport system A key feature of this embodiment is the provision and configuration of the second conveyor portion that conveys material from the scanner. For practical purposes, any detection system, and in particular known detection systems embodying electromagnetic technology, require an acquisition time in order to make a determination of an appropriate classification. The combined conveyance speed, capacity, length etc. of the second conveyor portion are preselected to result in a conveyance time between an output of the scanner and a point of delivery which is at least this predetermined acquisition time.

In this way the process may be fully automated, and is thereby particularly adapted to operation at or in the vicinity of the mining or quarrying site.

A suitable acquisition time may need to be at least 15 seconds and possibly at least 30 seconds. A suitable acquisition time may preferably be one that does not exceed 2 minutes and more preferably does not exceed 1 minute. The second conveyor portion is conveniently configured to have a combined conveyance speed and length such as to deliver material to the delivery point at the end of such a pre-determined acquisition time.

The scanning conveyor system includes a first conveyor portion and a second conveyor portion. Optionally, the first conveyor portion and second conveyor portion may be provided as discrete and separate first and second conveyor arrangements optionally of different manufacture and/or operating at different speed, capacity, orientation etc. In other cases, the first conveyor portion and second conveyor portion may comprise respective first and second parts of a single conveyor arrangement, for example being an endless conveyor of the material transport system.

In a possible more complete embodiment, the apparatus preferably further comprises a material sorter in communication with the scanning device, and for example under control of the classification module of the scanning system, and adapted to physically separate material classified in each one of the said classes from material classified in each other of the said classes.

Preferably, the sorter is also mounted on the chassis so as to form part of a single mobile apparatus.

It is a particular feature of many mineral deposits that they are stratified, so that higher quality ore is not distributed randomly, but tends to occur in such strata with lower quality ore/waste strata between. Thus, when material recovered from such a deposit is passed through an apparatus in accordance with the invention, there will tend to be progressive changes in the ore quality, rather than random distributions of high quality ore and waste. The apparatus of the invention is particularly adapted to the effective continuous processing of such ore distributions as it switches between one classification and another as the quality changes progressively.

The sorter is adapted to physically separate material classified in each one of the said classes, for example by the classification module, from material classified in each other of the said classes.

In an embodiment a sorter is a binary sorter adapted to physically separate material classified in each one of only two classes, for example by the classification module, said classes being for example economic ore accepted for processing and waste rejected for discard. Other embodiments may be adapted to sort into a larger plurality of classes.

The sorter for example comprises a material input to receive material, and a plurality of material outputs, including at least one output corresponding an output designated for material classified in each one of the said classes, for example by the classification module, and further comprises a selective diversion system to divert material from the input to a respective output in accordance with its classification, for example by the classification module. The selective diversion system may include one or more gates to selectively divert material within the sorter via selective paths from the input to a respective output, selectively openable closures for the respective outputs, selectively operable internal conveyors etc. In a possible embodiment, the separator comprises a gated arrangement which can selectively open only one of the respective outputs at a time.

In a possible case the sorter is disposed in an elevated position and makes use at least in part of the action of gravity to effect passage of material through the respective outputs. In such a case at least a part of the material transport system is an elevating conveyor that raises the material from a first height such as substantially ground level to a second height at which the sorter is located. In a possible case at least the second conveyor portion of the scanning conveyor is an elevating conveyor that raises the material from a first height at which the scanning device is located to a second height at which the sorter is located.

This allows physical separators to be used which make use of the elevated height to sort the material under action of gravity. In a possible embodiment, each output comprises a chute through which material can fall and the separator comprises a gated arrangement which can selectively allow material to fall through only one of the respective chutes at a time.

Advantageously, the apparatus of the invention is mobile and may be deployed and moved about at the working site to facilitate both the movement of material such as overburden or mineral from the working face to an onward transportation system for its transportation for subsequent processing for example at a remote site and its classification via the scanning system for prior to onward transportation.

Thus, in accordance with the invention in a second aspect, a system for the movement of material such as overburden or mineral from a working site comprises:

providing a material conveyor apparatus comprising:

a material shovel having a bucket adapted to pick up material and move the material from a work front;

a material conveyor apparatus in accordance with a first aspect of the invention positioned to receive material discharged from the bucket into the material receiving end and for example the material receiving hopper of the conveyor apparatus and to convey the same to the material discharge end;

an onward transportation system positioned to receive material from the material discharge end of the feed device.

The onward transportation system is positioned to receive material from the material discharge end of the material conveyor apparatus in accordance with a first aspect of the invention which has been classified by the material conveyor apparatus at least as between a waste class and a useable ore class and optionally as between a larger plurality of classes correlated to a level of target mineral within each such class. On the basis of this classification, materials in the respective classes may be differently allocated for onward transportation.

In a possible case, a separate onward transportation system may be provided to receive material classified in each one of the said classes separately from material classified in each other of the said classes.

In a possible case, a sorter as above described is configured to distribute material classified in each one of the said classes to such respectively separate onward transportation systems.

An onward transport system may comprise one or more transport trucks each including a material transport volume positioned to receive material from the material discharge end of the feed device. An onward transport system may comprise one or more overland conveyers each positioned to receive material from the material discharge end of the feed device.

In the case where an onward transport system comprises one or more transport trucks, a system in accordance with the second aspect of the invention preferably includes a sensor system to sense fill level as a truck is filled. Conveniently an apparatus in accordance with the first aspect of the invention includes a sensor system to sense fill level as a truck is filled in use. Conveniently such a sensor system is adapted co-operably with a conveyor control system to cause the material conveyor system to pause when a truck is detected as being full, allowing an empty truck to be positioned in replacement. The processing capacity of the material receiving end is preferably such as to allow for continuous operation of the shovel during this period.

Additionally or alternatively in the case where an onward transport system comprises one or more transport trucks, a system in accordance with the second aspect of the invention and conveniently an apparatus in accordance with the first aspect of the invention includes a sensor system to sense distribution of load within the truck. Conveniently such a sensor system is adapted co-operably with a conveyor control system to cause the conveyor apparatus to distribute material more evenly into a transport volume of the truck.

The use of sensors may have advantage in some cases for example in facilitating the automation of the process. However, in a possible alternative mode of operation manual signaling may be used as an alternative to sensors to monitor fill levels and fill distributions.

In accordance with the invention in a third aspect, a method for the movement of material such as overburden or mineral from a working site comprises:

a conveyer device having:
  a material receiving end for example having a material receiving hopper suitable for receiving material such as overburden or mineral at a working site;
  a material discharge end distal of the material receiving end;
  a material transport system disposed between the material receiving end and the discharge end so as in use to cause material received at the material receiving end to be conveyed to the material discharge end;
a scanning system including a scanning device disposed to scan the material being conveyed to the material discharge end and obtain a response from the material from which the material may be classified at least into two classes comprising at least a waste class and a useable ore class based on the response;
a chassis supporting the conveyer device and the scanning device;
a transport carriage supporting the chassis and adapted to cause the chassis to be movable across a surface for deployment in use;
moving the conveyor apparatus into position at a work front at the working site; picking up material from the work front;
transferring material to the material receiving end;
conveying material to the discharge end of the conveyor apparatus in such manner that the material is conveyed to and through the scanning device;
operating the scanning device to scan the material and monitor a response from the material, and thereby to classify the material at least into two classes comprising at least a waste class and a useable ore class based on the response.

More specifically the method may comprise:

providing a material shovel at a work front;

moving the material conveyor apparatus into position with the material receiving end adjacent the material shovel;

positioning an onward transportation system positioned to receive material from the material discharge end of the conveyer device.

picking up material from the work front using the bucket of a material shovel; transferring material from the bucket of the material shovel to the material receiving end;

conveying material to the discharge end of the conveyor device and thereby to the onward transportation system.

The method comprises classifying material at least as between a waste class and a useable ore class and optionally as between a larger plurality of classes correlated to a level of target mineral within each such class.

The method is thus a method for the sorting of material product recovered from a mining/quarrying operation at least to separately classify ore from waste and optionally to separately classify a larger plurality of classes correlated to a level of target mineral within each such class.

Preferably the method comprises effecting a classification after a pre-determined acquisition time has elapsed.

Preferably the method therefore comprises using a scanning system comprising a scanning device and a classification module to classify the material at least into two classes comprising at least a waste class and a useable ore class based on the response;
  conveying material produced from a mining/quarrying operation to and through the scanning system;
  after at least a pre-determined acquisition time has elapsed, classifying material in each one of the said classes by the classification module.

Preferably the method further comprises sorting materials as between the respective classes.

In a preferred case the separation step is carried out by operation of a suitable sorter, and for example comprises
  conveying the material from the scanning system to a sorter, wherein the material is not delivered to the sorter until the pre-determined acquisition time has elapsed;
  operating the sorter, for example in controlling communication with the classification module, to physically separate material classified in each one of the said classes from material classified in each other of the said classes.

Preferably the method further comprises allocating materials in the respective classes differently for onward transportation.

In a possible case, a separate onward transportation system may be provided to receive material classified in each one of the said classes, for example by the classification module, separately from material classified in each other of the said classes.

In a possible case, a sorter as above described is provided to distribute material classified in each one of the said classes to such respectively separate onward transportation systems.

An onward transport system may comprise one or more transport trucks each including a material transport volume positioned to receive material from the material discharge end of the feed device. An onward transport system may comprise one or more overland conveyers each positioned to receive material from the material discharge end of the feed device.

The method is preferably a method making use of the apparatus of the first aspect or the system of the second aspect and preferred features of each aspect will be understood to be interchangeable by analogy.

In a preferred use of the apparatus of the first aspect of the invention, a preferred system of the second aspect, or a preferred method of the third aspect, the material receiving end of the material conveyor apparatus may be positioned to be supplied and may be supplied with material such as overburden/mineral directly from the shovel. The material discharge end of the material conveyor apparatus may be positioned to supply and may supply material such as overburden/mineral directly to a truck or other onward transportation system.

Alternatively supply of material such as overburden from the shovel to the receiving end of the material conveyor apparatus and/or supply of material such as overburden/mineral from the discharge end of the material conveyor apparatus to a truck or other onward transportation system may be indirect in the sense that it passes via intermediate equipment. For example, in a possible embodiment or use a sizer or other material processor may be interposed between and process material passing between the shovel and the receiving end of the material conveyor apparatus. Thus, the system and method may be adapted for handling of run of mine or sized material, and is not restricted by particular material size.

The material receiving end of the material conveyor apparatus is for example a material receiving hopper. The material receiving hopper may have a capacity and/or a shape generally matched to the capacity and/or shape of a material transport volume of the truck or other onward transportation system with which it is intended to be used.

The material conveyor apparatus may be conformed as a surge conveyor feeder by provision of an endless conveyor disposed between the material receiving end and the discharge end so as in use to cause material received at the material receiving end to be conveyed to the material discharge end. The endless conveyor is for example an endless belt conveyor or apron/plate feeder.

The material conveyor apparatus is provided with a chassis supporting the material conveyor apparatus and a transport carriage supporting the chassis and adapted to cause the chassis to be movable across a surface for deployment in use. The material conveyor apparatus is thus adapted for use as a mobile conveyor and classifier unit.

The transport carriage in a possible embodiment includes one or more ground contactable transport arrangements adapted to effect movement of the chassis across a ground surface in use. For example, the transport carriage may include a pair of parallel, driven, ground-engaging tracks.

In a possible embodiment the transport carriage may include a pair of parallel, separately driven ground-engaging tracks and one or more control devices for selectively driving the respective said tracks at different speeds so as to effect steering of the transport carriage.

In a possible embodiment the chassis may be rotatably supported on the transport carriage to permit rotation of the chassis and conveyor apparatus thereon relative to the transport carriage.

The shovel is preferably also mobile. For example, the shovel may include a mounting chassis, transport carriage and drive arrangement as above.

In a possible application of the invention in the context of the movement of material such as overburden or mineral using truck-shovel loading principles, the material conveyor apparatus in accordance with the first aspect of the invention may sit between the shovel, which supplies material such as overburden or mineral to the material receiving end and for example to a material receiving hopper, and the truck, which is supplied by material such as overburden or mineral from the material discharge end.

Three distinctly characteristic features of the material conveyor apparatus in accordance with the first aspect of the invention serve to facilitate more efficient material handling in a truck-shovel loading system.

First, the combination of a material receiving portion and transport system which may be a continuous conveyor to cause material to be conveyed to the material discharge end means that the material conveyor apparatus may in a possible embodiment readily be configured to function as a surge conveyor. As a result, discrete batch supply from the shovel at the material receiving end may be converted to a more even continuous supply at the discharge end.

This facilitates more even loading of the truck, and makes it more likely that load levels of nearer 100% can be achieved. Additionally, subject to appropriate capacity design for an apron region of the hopper at the material receiving end, it may be possible to continue to supply the apron via the shovel whether a truck is immediately in place or not, increasing overall throughput volumes.

Alternatively, the material conveyor apparatus may simply be designed oversized to accommodate batch loading.

Second, the transport carriage supporting the chassis on which the material conveyor apparatus itself sits makes the apparatus mobile, so that it can be brought into and out of a desired operational position as required, co-operating with the movement of the operational front and the movement of the trucks to improve operational efficiency.

Third, it allows material classification and in the preferred case additionally material sorting at the operational front.

Advantageous in the application of all aspects of the invention to truck-shovel loading is the conformance of at least a part of the material transport system to function as a mobile surge feeder between the shovel and the truck. This facilitates more even loading of the truck, and makes it more likely that load levels of nearer 100% can be achieved. For example, fill levels of more than 90% and more preferably at least 95-98% are achievable, which is not typically achievable by batch filling using conventional shovel fill protocols. The processing capacity of the surge feeder may be designed to be such relative to the cycle time of the shovel that the shovel operator cannot overwhelm it, allowing for effectively continuous operation of the shovel.

Subject to provision of this mobile surge conveyor feeder in accordance with the first aspect of the invention for use between the shovel and the truck in a system and method of the second and third aspects of the invention, the shovel and the truck themselves may be of conventional known design.

If the apparatus of the invention is to be optimised for consistent classification it is generally desirable that the recovered material to be passed through the scanning system is of consistent and appropriate size. Accordingly, the apparatus of the invention preferably further comprises a mineral sizer module having a mineral output positioned before the scanning system in a material transport direction, the material transport system being configured to deliver sized mineral from the mineral output to and through the scanning system.

Suitable sizer technology is well established, and in particular can readily be provided at a mining or quarrying site, either incorporated into the mobile apparatus of the first aspect of the invention, or via a separate mobile or static apparatus. Preferably, the apparatus of the first aspect of the invention includes a sizer.

A desirable lump size might for example be less than 250 mm more preferably less than 150 mm. The sizer of the apparatus invention is conveniently rated to such a lump size. The sizer of the apparatus of the invention preferably further comprises a mechanism to remove fines from the recovered material.

Mineral sizer technology is well established. Such an apparatus typically comprises at least two breaker drums having breaker teeth projecting outwardly and generally substantially radially therefrom mounted side by side with parallel axes in a common housing. For example, such drums might have relatively large teeth co-operating on the opposed drums to break mineral lumps down. Opposed drums are typically configured to be, though not limited to be, contra-rotating, and may rotate in either sense. Examples of such apparatus are described in general terms in EP0096706. A sizer for example comprises at least two breaker drums each having circumferentially extending teeth projecting outwardly from the body of the drum and for example substantially radially therefrom, the drums being rotatably housed with their axes parallel. Rotation of the at least two drums causes mineral to be gripped between respective teeth and broken, in particular by a gripping and snapping action.

In a preferred modification at least some of the teeth on a drum are arranged with a progressive relative offset. That is, the rotary position of each such tooth is offset relative to its neighbour. In this way a point of engagement for a given particle size moves progressively longitudinally and distributes the load along a drum during use. For example, the teeth are thereby arranged so as to define a series of discrete circumferentially spaced progressive and for example helical formations extending along the drum, such term being understood as encompassing a longitudinal series of teeth with a progressive offset causing teeth in the series to be disposed in scrolling manner about the drum, whether in a strictly mathematical helix or part thereof or otherwise.

Preferably the teeth on at least a pair of adjacent drums are arranged in discrete helical formations extending along each drum. Preferably the axial positions of the drums are arranged so that during rotation each tooth of a helical formation on one drum projects towards and for example into the spacing between adjacent teeth of a helical formation on the other drum.

In a possible embodiment, the teeth on each drum are conveniently arranged in circumferentially extending groups of teeth, the groups of teeth on one drum being located between adjacent groups of teeth on the other drum, the teeth on at least one of said pair of drums being arranged to define a series of discrete circumferentially spaced progressive and for example helical formations extending along the drum as above described.

The apparatus of the invention preferably comprises a mineral sizer module having any combination of the above features.

The sizer preferably includes fines discharge which discharges undersized product material and for example has a fines sorter such as a fines sieve which facilitates removal of undersized product from the sizer.

The sizer preferably includes an oversize discharge facilitates removal of oversized product that has not been broken below a desired size from the sizer.

Thus, the sizer discharges material of a size above a minimum size and below a maximum size, the respective minimum size and maximum size being selected as appropriate for the subsequent classification and processing steps. Material lumps below the said minimum size are discharged by the fines discharge. Material lumps above the said maximum size are discharged by the oversize discharge.

The sizer is configured to receive recovered material from the mining or quarrying site via a sizer input. In particular, the sizer is supplied with a continuous feed of recovered material. Accordingly, the apparatus preferably additionally comprises a sizer feeder to convey recovered material in continuous manner to an input of the sizer.

The sizer feeder for example has:
a material receiving end having a material receiving end suitable for receiving product material at a working site; a material discharge end distal of the material receiving end;
an endless conveyor disposed between the material receiving end and the discharge end so as in use to cause material received at the material receiving end to be conveyed to the material discharge end.

The sizer feeder for example includes an apron feeder/surge loader.

In use, the intention is that the feeder sits between a batch loading system such as a shovel supplying mined or quarried product to the material receiving apron, and the sizer input, which is supplied by material product in continuous manner from the material discharge end.

In then preferred case, the sizer is embodied in a sizer module that forms part of a mobile apparatus in accordance with the first aspect of the invention, positioned before the scanning system in a material transport direction, and having a sizer module material receiving end and for example a hopper which may be fed directly from the shovel, and having a mineral output that passes sized mineral onwards in a material transport direction towards the scanning system. Such a combined apparatus is usually advantageous.

Alternatively, a separate sizer may be provided positioned before an apparatus in accordance with the first aspect of the invention in a material transport direction to receive a supply of material such as overburden directly or indirectly from the shovel, to size the same, and to pass the same via a mineral output that passes sized mineral onwards in a material transport direction to an apparatus in accordance with the first aspect of the invention.

BRIEF DESCRIPTION OF THE DRAWINGS

In the drawings, which illustrate exemplary embodiments of the invention.

DETAILED DESCRIPTION OF THE ILLUSTRATED EMBODIMENTS

Different embodiments of conveyor apparatus according to the first aspect of the invention are shown in an example use in the figures.

Figure 1:
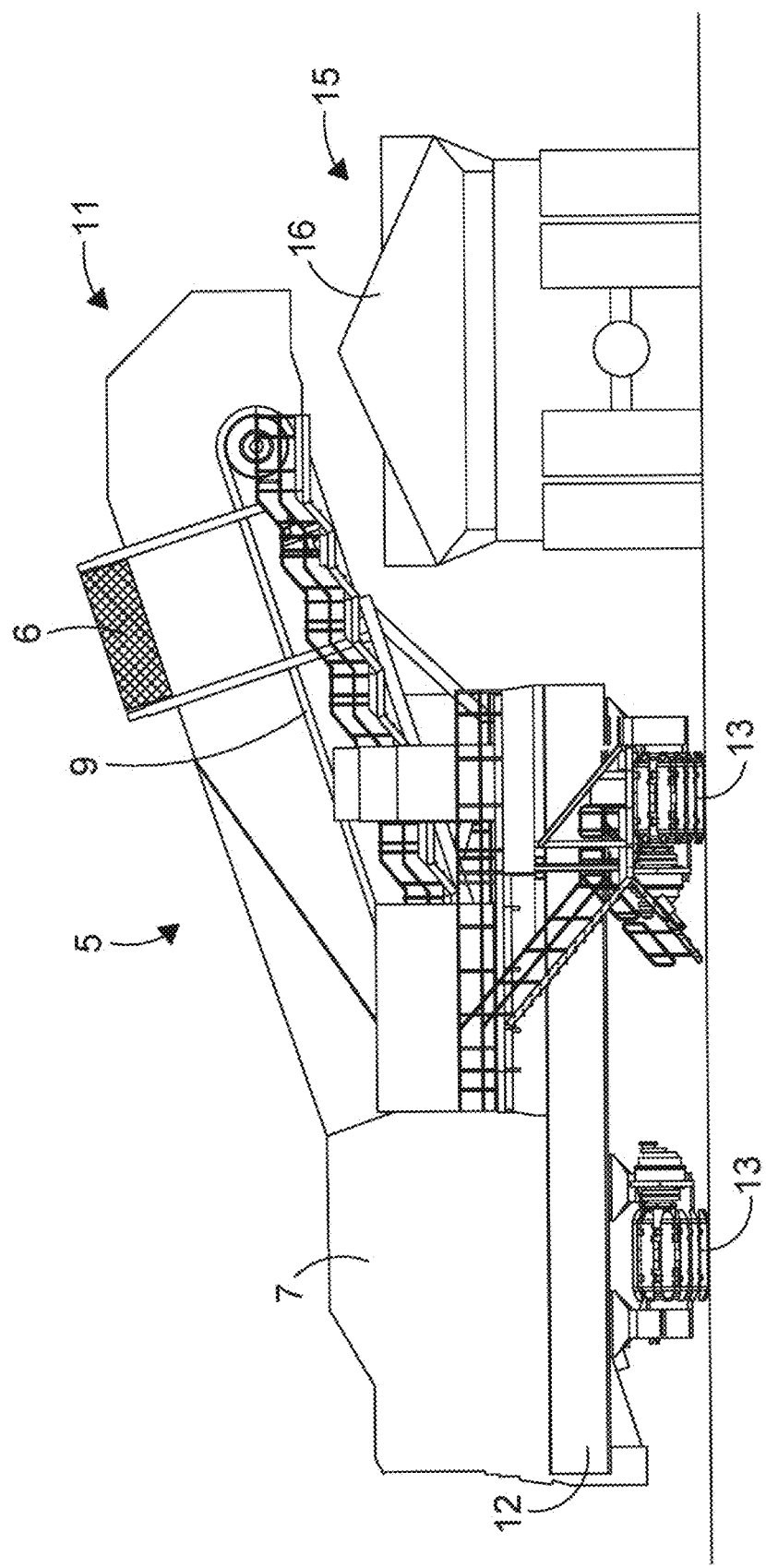
FIG. 1 is a diagrammatic side elevation of the conveyor apparatus of the first aspect of the invention in an example use with other apparatus thereby constituting an embodiment of the system of the second aspect of the invention and illustrative of an embodiment of the method of the third aspect of the invention.

In the illustration in FIG. 1, a possible system embodying the principles of the second aspect of the invention is shown in which the conveyor apparatus is configured as a simple conveyor with a scanner to give a classifying function. A mobile feeder 5 constituting a possible embodiment of the first aspect of the invention, and a truck 15 are shown positioned left to right in series. The system may employ alternative onward transport to the truck, for example including overland conveyers without departing from the principles of the invention. In the illustration in FIG. 2, the system of FIG. 1 is modified by providing the mobile feeder with a material sorter downstream of the scanner.

Figure 3:
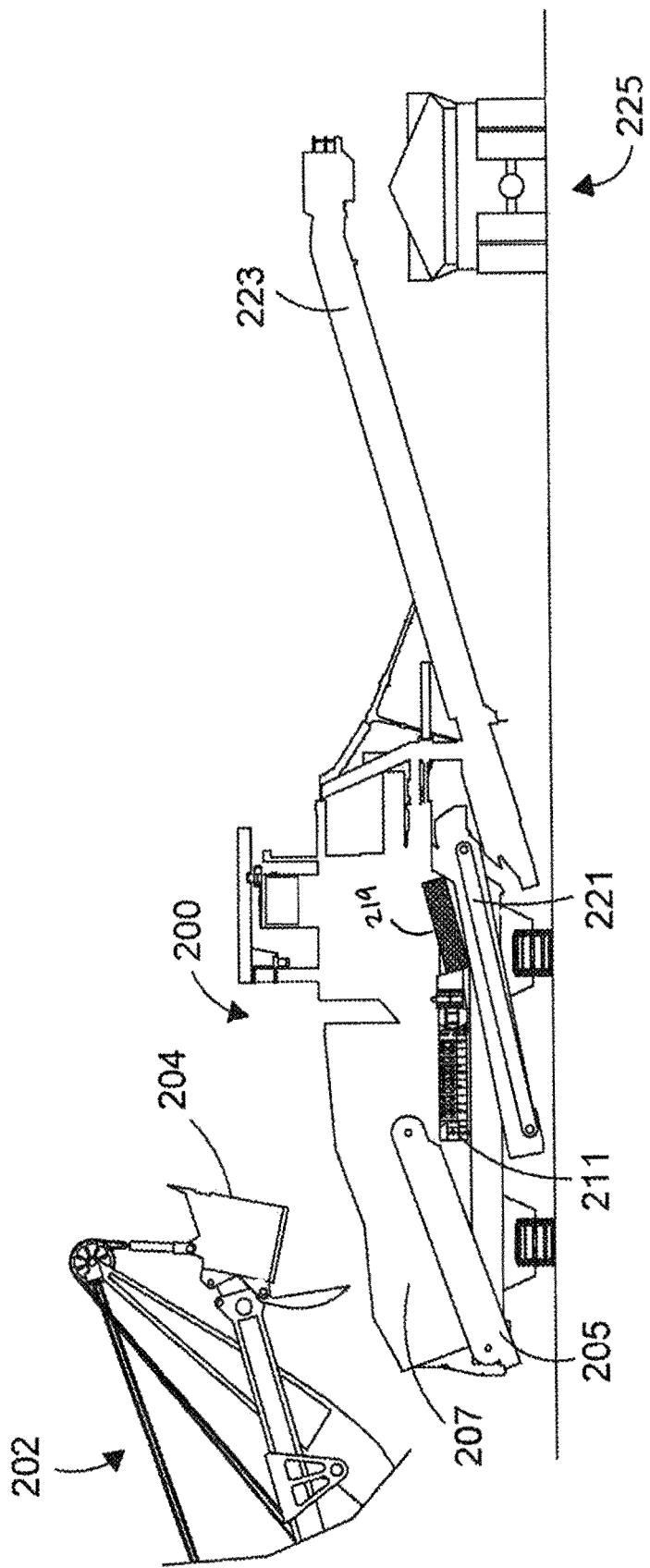
FIG. 3 is a diagrammatic side elevation of an alternative embodiment of conveyor apparatus of the first aspect of the invention in an example use with an alternative arrangement of other apparatus thereby constituting an alternative embodiment of the system of the second aspect of the invention and illustrative of an alternative embodiment of the method of the third aspect of the invention.
Figure 4:
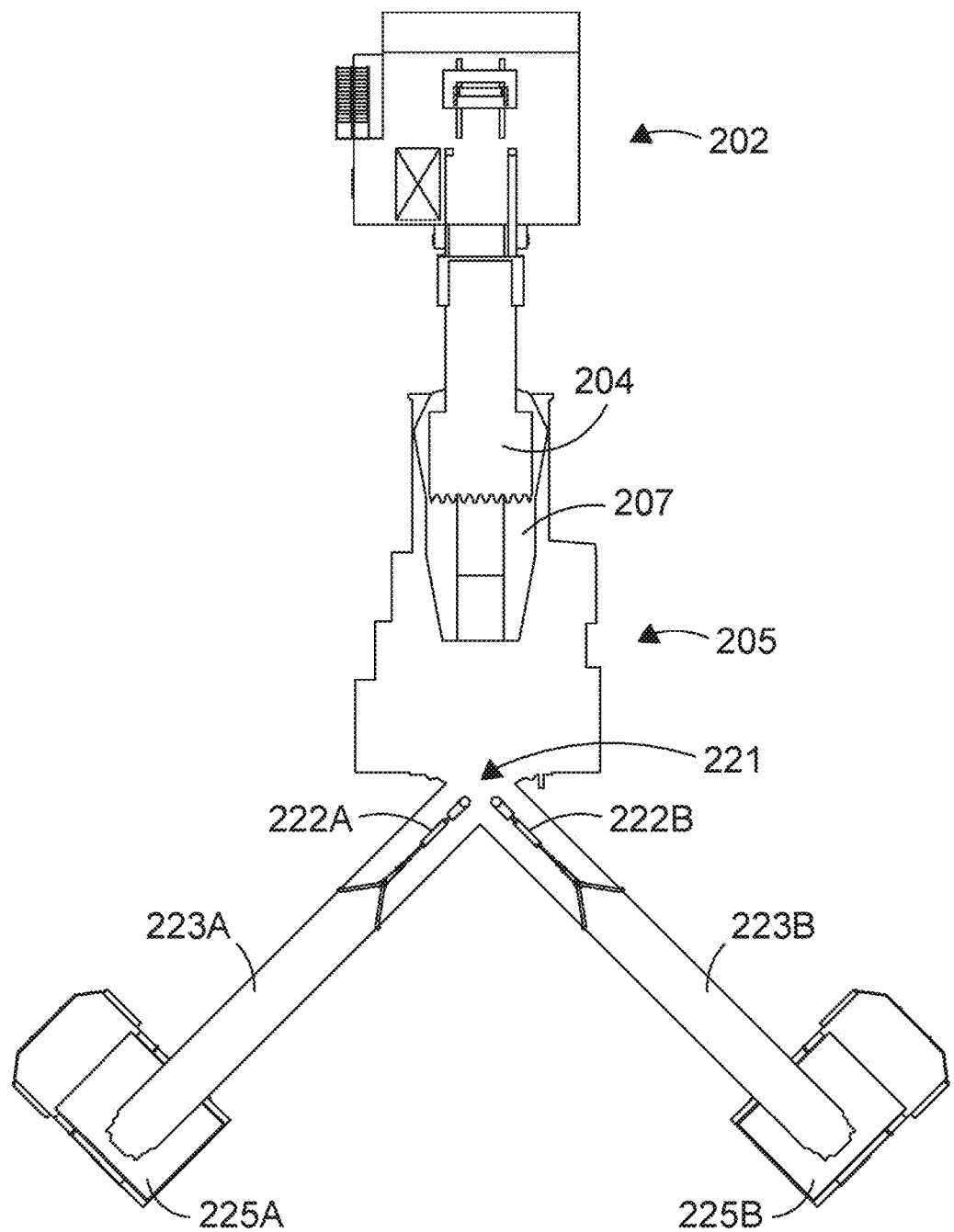
FIGS. 4 and 5 show alternative arrangements for supply of sized and classified and optionally sorted material to onward transport.
Figure 5:
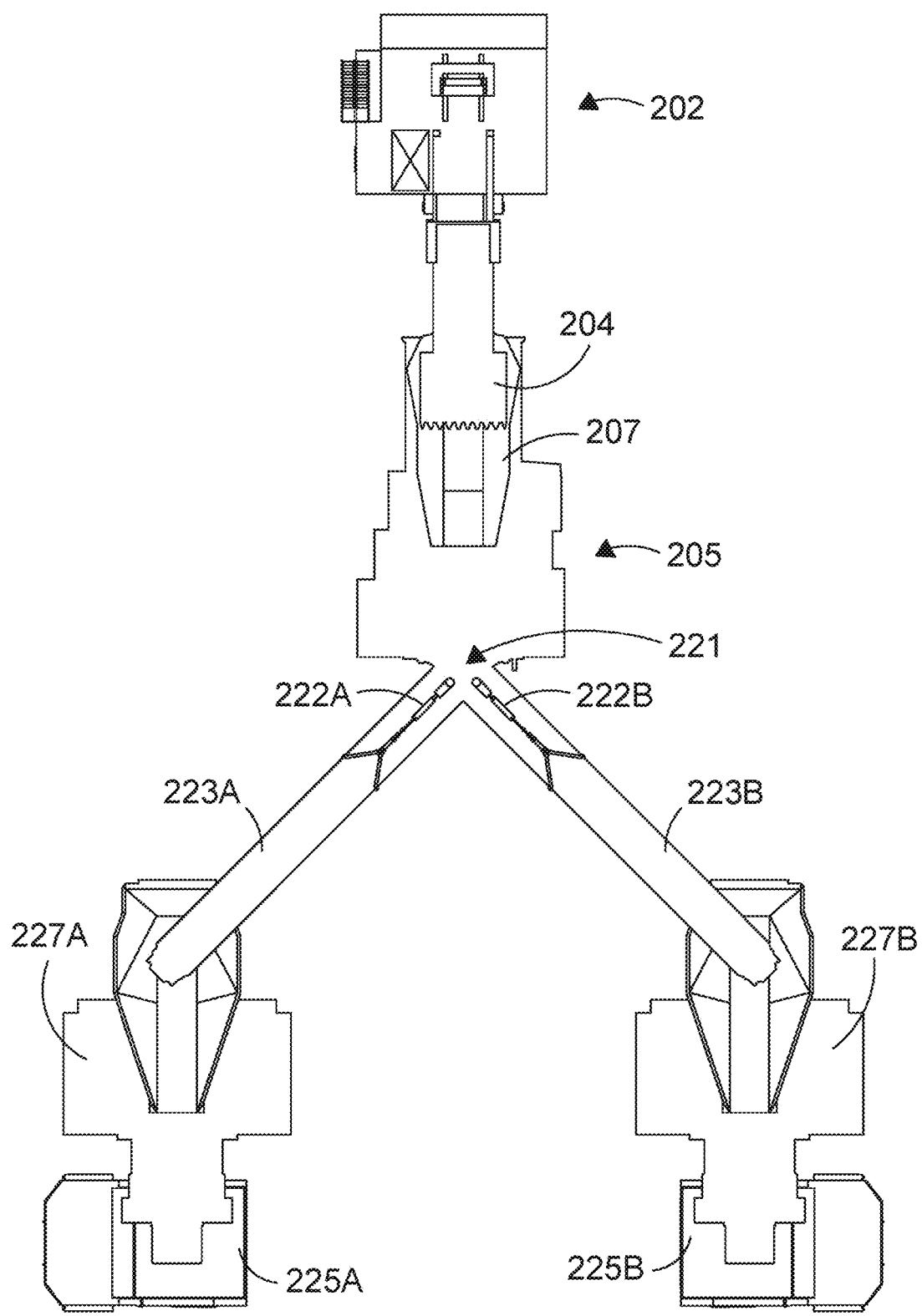

In the FIG. 3 arrangement the conveyor apparatus includes a mobile mineral sizer. FIGS. 4 and 5 show alternative arrangements for supply of sized and classified and optionally sorted material to onward transport.

In all cases trucks are shown but the system may employ alternative onward transport to the trucks, for example including overland conveyers without departing from the principles of the invention. In all cases discussion is of loading using a shovel, but other loading means such as draglines may be used without departing from the principles of the invention.

Figure 2:
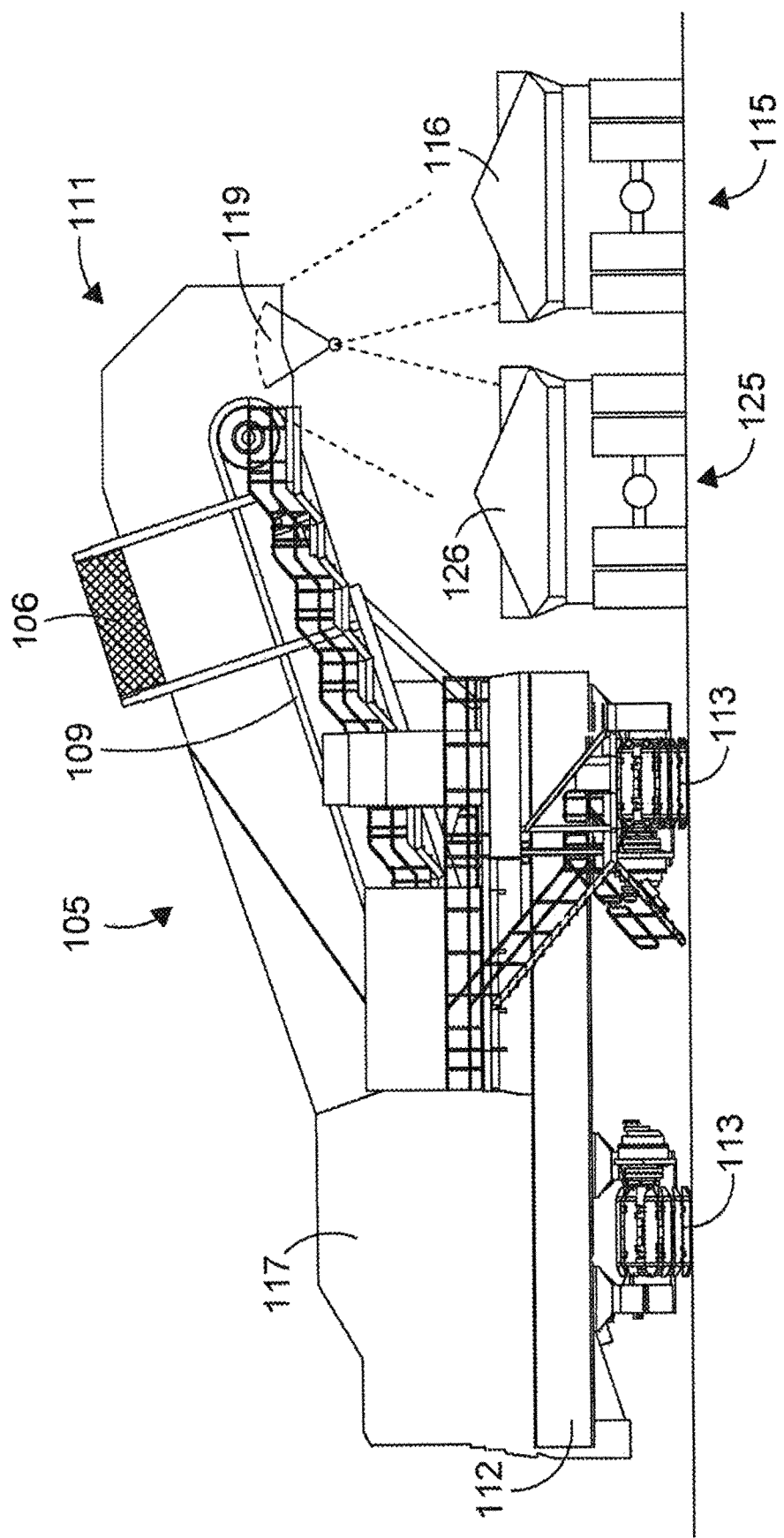
FIG. 2 is a diagrammatic side elevation of an alternative embodiment of conveyor apparatus of the first aspect of the invention in an example use with an alternative arrangement of other apparatus thereby constituting an alternative embodiment of the system of the second aspect of the invention and illustrative of an alternative embodiment of the method of the third aspect of the invention.

Other alternative additional processing apparatus may be provided here or elsewhere within the system without departing from the principles of the invention, or such additional processing apparatus may be dispensed with altogether as shown in FIGS. 1 and 2.

In the embodiment of FIG. 1 the conveyor apparatus comprises a simple conveyor 5 with a scanner 6 to give a classifying function. Advantageously in the embodiment, the conveyor apparatus is configured as a surge feeder, but this is not a requirement of the invention.

Overburden/mineral material is removed by a mobile shovel in conventional manner (not shown, but in like manner to that shown in FIG. 3). In an advantageous mode of operation it is passed directly to the surge feeder 5 from the bucket of the mobile shovel directly to the hopper 7 of the surge feeder 5. Overburden/mineral material is supplied by the shovel, directly or indirectly, to the hopper 7 in the apron region of the surge feeder 5. It is conveyed via an endless conveyor belt 9 to a discharge end 11 where a truck 15 waits to receive it into its load volume 16.

The apparatus is characterized in being mobile, by virtue of being mounted on a chassis 12 and provided with parallel ground engaging tracks 13.

The apparatus is additionally characterized by the provision of the scanner 6 to give a classifying function. The scanner 6 is positioned part way along the conveyer belt 9 in suitable position to obtain a response from material as it passes along the belt. The scanner has a sensor which is for example a gamma ray sensor, such as will be familiar to the skilled person as being useful for the automatic grading of various ores. The gamma ray sensor for example comprises one or more gamma ray emitters and one or more gamma ray detectors.

The material to be classified passes through the scanner 6 and through the detection zone of the sensor and is conveyed onward via the endless belt conveyor 9. This serves as a scanning conveyor, a first portion of which conveys material to and through the scanner and a second portion of which conveys material onward to the discharge end 11. This second portion of the conveyor serves not merely to convey the material, but also to take at least a pre-determined time to do. The sensor of the scanner will require an acquisition time in order to make the necessary determination. A suitable acquisition time might for instance be at least 30 seconds. The conveyor 9 operates at a length and speed which are together selected to provide at least this acquisition time as the material passes from the scanner 6 to the discharge end 11.

The scanner may include a classifier or be in remote data communication with a remote classifier. The classifier is able to classify the material at least into two classes comprising at least a waste class and a useable ore class based on the response of the scanner. It is this at least possible to know the class of the material loaded into the truck 15.

A development of the FIG. 1 embodiment is shown in FIG. 2 which is of broadly similar arrangement until the discharge end.

Overburden/mineral material is passed to the feeder 105 from the bucket of the mobile shovel to the hopper 117 of the surge feeder 105. It is conveyed via an endless conveyor belt 119 to a discharge end 111. The apparatus is mobile, by virtue of being mounted on a chassis 112 and provided with parallel ground engaging tracks 113. The scanner 106 gives a classifying function.

In this case however two trucks 115, 125 wait to receive material it their respective load volumes volume 116, 126.

The apparatus is distinguished by the provision of a separation module 119 at the discharge end 111 to give a sorting function supplementary to the classification function.

The material passes through the scanner 106 and through the detection zone of the sensor and is conveyed onward to the separation module comprising a physical material separator via the endless belt conveyor 109. This serves as a scanning conveyor, a first portion of which conveys material to and through the analysing module and a second portion of which conveys material onward to the separator. This second portion of the conveyor serves not merely to convey the material, but also to take at least a pre-determined acquisition time as the material passes from the sensor to the separator.

In a preferred embodiment, the conveyor 105 is an elevating conveyor, and the separator 119 is provided at an elevated height above that of the scanner. This allows physical separators to be used which make use of the elevated height to sort the material under action of gravity.

The gradient at which the belt will operate will be dependent on the length of belt as well as height required for bin loading. The gradient may affect the method of conveying the material to the separator. In case of gradient=0-9 degrees a normal troughed belt can be used. For gradient 10-20 degrees a chevron troughed belt should be used. For gradients above 20 degrees, a specialist lift belt should be considered.

In the embodiment, it is envisaged that material will be sorted in a binary way into one of two classes, for example "accept" and "reject" which will represent economically useful ore from which recoverable quantities of mineral may be economically obtained, and "waste", being material which does not have such economically recoverable quantities of mineral. A first truck 115 receives the former and a second truck 125 receives the latter. Other transport means could be used.

The physical separator 119 acts under the control of the scanner 106, and directs material to one or other of these trucks depending on the response of the sensor. In a possible embodiment, the physical separator comprises a gated arrangement which can selectively open one or other of two apertures respectively feeding into the trucks. For example, the physical separator may include separate chutes through which material can fall respectively into the trucks and a gate which selectively opens one and closes the other of said chutes under the control of the analyser in response to the signal detected by the sensor.

It is the intention that the apparatus in the invention will be used, and the method of the invention thereby performed, at or in the vicinity of the mining or quarrying location, so that waste need not be transported any significant distance, and only economically useful ore need be transported to onward processing. It is particular advantage of the arrangement that it may be possible to adjust the classification parameters of the scanning system so as to produce a variable classification as between economically useful ore and waste which may thus take account of the factors such as economic factors which may vary over time.

The specification for the final apparatus will vary as per each individual application. The concept will thus have to be scalable for different pits and locations. Design components will be modular to facilitate this.

In an example use FIGS. 1 and 2 illustrate a truck loading operation. Advantageously in such a case, the conveyor apparatus is configured as a surge feeder.

The shovel and the truck(s) may be of generally conventional design. Open cast mining operations are constantly seeking more flexible solutions to match truck and shovel capacities and processing rates and to improve fill level accuracy and efficiency in particular. In direct loading systems, where a shovel such as illustrated in the embodiment loads a truck directly batch by batch, trucks rarely reach 90% load and load rates of say 6000 tons per hour might be typical where a shovel might in principle have a capacity of 10000 tons per hour because of delays as each truck is replace. The surge feeder of the invention provides an admirable solution.

The surge feeder of the embodiments is positioned between the shovel and the truck(s). The surge feeder is able continuously to process overburden/mineral from the shovel and provide it to load a truck. The mobile arrangement of surge feeder enables a truck to drive alongside the surge feeder output end eliminating the need for it to reverse into position directly adjacent the shovel. This potentially improves truck movement efficiency.

The embodiment provides a surge feeder which is made mobile so that it can move along with the shovel, allowing the operation to use the shovel to its maximum capacity, and which additionally classifies and in the preferred case sorts material as the truck is loaded. The surge feeder is positioned between the shovel and the truck, and is therefore able to continuously to process overburden/mineral supplied by the shovel, whether directly to its apron region or indirectly via intermediate processing equipment. The surge feeder is drivable on its tracks and pivotable on its chassis allowing it to be positioned optimally to feed the trucks progressively. A truck need never to reverse into position. It can merely position itself alongside. The processing capacity of the surge feeder is designed to be greater than that of the shovel, so that the shovel can operate continuously.

Loading the trucks via the surge feeder offers potential efficiency advantages for a number of reasons. The more steady continuous operation allows for the possibility of more even loading, for higher fill levels, and avoids the shock loading effect of dropping 100 ton batches into the truck bed.

Advantages of such a system might include the following potential efficiency savings:

maximized volume of operation due to improved truck fill factors;

savings on operating expenses by reduction in unnecessary truck operation; reduction of truck wear and tear and damage;

cleaner and more precise operation at the processing site, with a possible increase in truck tyre life with cleaner pit floors;

avoidance of damage to truck bodies by loading buckets.

Thus, in the FIGS. 1 and 2 embodiments, the material conveyor apparatus of the first aspect of the invention is a simple single conveyor arrangement, in that the material transport system is configured to cause material received at the material receiving end to be conveyed directly to the material discharge end via a suitable scanner and optional sorter.

Alternatively, the material conveyor apparatus of the first aspect of the invention may further comprise one or more material processing modules adapted to effect a material processing operation as the material is conveyed from the material receiving end to the material discharge end.

In the FIG. 3 arrangement an embodiment of conveyor apparatus 200 of the first aspect of the invention includes a mobile mineral sizer. The FIG. 3 embodiment is shown in side elevation.

Overburden/mineral material to be classified and optionally sorted is first sized. The material needs to be appropriately sized to a consistent, reasonably uniform lump size for processing by the scanning device. An example lump size might for example be less than or equal to 150 millimetres. Excessively fine materials could also be removed.

Overburden/mineral material is supplied by the bucket 204 of the shovel 202 to the hopper 207 in the apron region of the mobile sizer feed conveyor 205. It is conveyed via an endless conveyor belt to a discharge end where it is passed to the sizing module 211.

To effect this, a sizing module includes a sizer or crusher comprising in the example two contra rotating rollers which will typically be provided with radially projecting breaker teeth (not shown in the figure) in familiar manner.

Material is supplied to the sizer from a left to right direction in the figure and oversized lumps are broken by the rollers, and in particular in a typical case broken by being gripped between opposed teeth and broken through a tensile snapping action. The sizer is appropriately rated to produce the desired lump size, in the example embodiment to a maximum of for example 150 millimetres.

It is also desirable to screen out excessively fine material. Again, this may be effected in familiar manner by use of a screen (not shown) through which fines fall to be conveyed away via a fines conveyor.

It may be desirable to provide a constant feed to and through the ore analyser. This may be achieved using a suitable continuous feeder/loader, such as an apron feeder with a surge loader.

Suitably sized material lumps are then passed to a material analysing module comprising a scanner 219 positioned about the intermediate conveyor 221 of the sizer. The scanner is conveniently at or closely adjacent to the discharge of the intermediate conveyor 221 which takes the material to and through the scanner.

The scanner may include a classifier or be in remote data communication with a remote classifier. The classifier is able to classify the material at least into two classes comprising at least a waste class and a useable ore class based on the response of the scanner. It is thus at least possible to know the class of the material being passed via the discharge conveyor of the sizer 223 to be loaded into the truck 225.

FIGS. 4 and 5 show alternative arrangements for supply of sized and classified and optionally sorted material to onward transport, each in plan view. In each case the system includes the same mobile sizer arrangement as far as the scanner and like numbers are used for like components.

Overburden/mineral material is supplied by the bucket 204 of the mobile shovel 202 to the hopper 207 in the apron region of the mobile sizer feed conveyor 205. It is conveyed via an endless conveyor belt to a discharge end where it is passed via the sizing module and scanner (not visible in the figures) to a discharge end 221 of the sizer intermediate conveyor.

At this point the design varies. In each case physical diverters 222A, 222B are used to distribute classified materials between one of two discharge conveyors 223A, 223B. The embodiments of FIGS. 4 and 5 thus have a facility for bulk sorting at the face. The two discharge conveyors 223A, 223B respectively load trucks 225A, 225B. Other transport means such as overland conveyors could be used. The FIG. 4 embodiment loads the trucks directly from the discharge ends of the discharge conveyors. In the FIG. 5 embodiment, intervening surge feeders 227A, 227B are deployed.

In all embodiments a mobile apparatus is provided that provides for bulk scanning at least for bulk classification and optionally for bulk sorting to take place at the mineral recovery face. Subject to this requirement, features of the various embodiments will be understood to be interchangeable.

For bulk sorting to take place on the face the apparatus will be adapted to be loaded in the pit by means of shovels, loaders or draglines after blasting. Material sizes will initially range from very coarse to very fine. For sorting to take place the envisaged known sensors require ore to be crushed to <=150 mm. This means a jaw crusher/screen may be employed as above discussed.

The apparatus or at least some of the modules thereof should be mobile and maneuverable. The apparatus or module may be tracked. Track systems mounted with steel tracks will probably be most resilient.

The invention thus provides a mobile material classifier, optionally with sorting capability, and optionally with other material processing such as sizing capability. It thus offers a solution which provides much greater flexibility in classifying and optionally sorting of mineral in-situ at or about the vicinity of its mining or quarrying with a potential of avoiding of the economic and technical disadvantages which might be associated with conventional methods where the mineral is sorted and graded at a processing site.

The invention claimed is:

1. A material conveyor apparatus comprising:
    a conveyer device suitable for conveying, at a working site, overburden or mineral produced from a mining or quarrying operation, having:
        a material receiving end suitable for receiving overburden or mineral at a working site;
        a material discharge end distal of the material receiving end;
        a material transport system disposed between the material receiving end and the discharge end so as in use to cause material received at the material receiving end to be conveyed to the material discharge end; and
    a scanning system comprising a scanning device disposed to scan the material being conveyed to the material discharge end and obtain a response from the material from which the material may be classified at least into two classes comprising at least a waste class and a useable ore class based on the response, wherein the scanning system is configured to perform a classification function to classify the material at least into two classes comprising at least a waste class and a useable ore class based on the response of the scanning device;
    a chassis supporting the conveyor device and the scanning device;
    a transport carriage supporting the chassis and comprising a pair of parallel, driven, ground-engaging tracks so as to be adapted to cause the chassis to be movable across a surface for deployment in use, wherein the pair of parallel, driven, ground-engaging tracks are positioned perpendicular to a longitudinal axis of the chassis; and
    wherein the material conveyor apparatus comprises a surge loader, wherein the surge loader is positioned between a material shovel and a truck, the surge loader being drivable via the pair of parallel, driven, ground-engaging tracks and pivotable via the chassis allowing the surge loader to be positioned optimally to feed the truck without a need for the truck to be reversed into position.

2. The apparatus according to claim 1, wherein the material conveyor apparatus further comprises one or more material processing modules adapted to effect a material processing operation as the material is conveyed from the material receiving end to the material discharge end, including a processing module comprising a mineral breaker or sizer; and the material transport system comprises a plurality of conveyor arrangements successively disposed to convey material received at the material receiving end via the material processing module or modules to the material discharge end.

3. The apparatus according to claim 2, wherein the mineral breaker or sizer has a mineral output positioned before the scanning system in a material transport direction, the material transport system being configured to deliver sized mineral from the mineral output to and through the scanning system.

4. The apparatus according to claim 1, wherein the scanning system is adapted to scan the mineral and monitor some response therefrom, being a response selected to be one which characteristically varies depending upon the level of one or more target minerals present in the material.

5. The apparatus according to claim 1, wherein the scanning system is adapted to classify the material at least into two classes based on predetermined demarcations correlated to levels of target mineral, wherein the predetermined demarcations between the at least two classes are adjustable.

6. The apparatus according to claim 1, wherein the scanning device includes one or more signal emitters to emit a signal in the direction of the material and one or more signal detectors to detect a response signal produced by the material following interaction of the emitted signal therewith.

7. The apparatus according to claim 6, wherein the scanning device includes one or more gamma ray emitters and one or more gamma ray detectors.

8. The apparatus according to claim 1, comprising a scanning conveyor including a first conveyor portion to convey material to and through the scanning system and second conveyor portion to convey the material from the scanning system to a point of delivery, wherein the second conveyor portion is configured to have a combined conveyance speed and length such as to deliver material to the point of deliver after at least a pre-determined acquisition time has elapsed; wherein the material transport system comprises an endless conveyor configured to constitute such a first conveyor portion, or such a first conveyor portion and second conveyor portion.

9. The apparatus according to claim 1, comprising a material sorter in communication with the scanning device, and adapted to physically separate material classified in each one of the classes from material classified in each other of the classes, wherein the sorter is mounted on the chassis and the sorter comprises a material input to receive material, and a plurality of material outputs, including at least one output corresponding an output designated for material classified in each one of the classes, and further comprises a selective diversion system to divert material from the input to a respective output in accordance with its classification.

10. The apparatus according to claim 9, wherein the selective diversion system comprises one or more gates to selectively divert material within the sorter via selective paths from the input to a respective output and/or selectively openable closures for the respective outputs.

11. The apparatus according to claim 9, wherein the sorter is disposed in an elevated position and makes use at least in part of the action of gravity to effect passage of material through the respective outputs and at least a part of the material transport system is an elevating conveyor that raises the material from a first height to a second height at which the sorter is located.

12. The apparatus in accordance with claim 1, wherein the material receiving end of the material conveyor apparatus is a material receiving hopper.

13. The apparatus in accordance with claim 1, wherein the transport carriage comprises one or more ground contactable transport arrangements adapted to effect movement of the chassis across a ground surface and wherein the chassis is rotatably supported on the transport carriage to permit rotation of the chassis and apparatus thereon relative to the transport carriage.

14. A method for the movement of material from a working site comprising:
providing a material conveyor apparatus according to claim 1;
moving the conveyor apparatus into position at a work front at the working site;
picking up material from the work front;
transferring material to the material receiving end;
conveying material to the discharge end of the conveyor apparatus in such manner that the material is conveyed to and through the scanning device; and
operating the scanning device to scan the material and monitor a response from the material, and thereby to classify the material at least into the two classes based on the response.

15. The method in accordance with claim 14, the method comprising:
providing the material shovel at the work front;
moving the material conveyor apparatus into position with the material receiving end adjacent the material shovel;
positioning an onward transportation system positioned to receive material from the material discharge end of a feed device;
picking up material from the work front using a bucket of the material shovel;
transferring material from the bucket of the material shovel to the material receiving end; and
conveying material to the discharge end of the conveyor apparatus and thereby to the onward transportation system.

16. The method in accordance with claim 14, comprising sorting materials as between the respective classes.

17. The method in accordance with claim 16, wherein material is sorted via a binary classification into a waste class in which levels of target mineral are below economically recoverable levels and a useful ore class in which levels of target mineral are above economically recoverable levels.

18. The apparatus in accordance with claim 1, wherein the truck receives an entire load of a first class of the two classes of materials classified by the scanning system.

19. The apparatus in accordance with claim 18, wherein the first class of material comprises the waste class.

20. The apparatus in accordance with claim 1, wherein the truck receives an entire load of a second class of the two classes of materials classified by the scanning system.

21. The apparatus in accordance with claim 20, wherein the second class of material comprises the useable ore class.

22. A system for the movement of material from a working site comprising:
a material conveyor apparatus comprising:
a conveyer device suitable for conveying, at a working site, overburden or mineral produced from a mining or quarrying operation, having:
a material receiving end suitable for receiving overburden or mineral at a working site;
a material discharge end distal of the material receiving end;
a material transport system disposed between the material receiving end and the discharge end so as in use to cause material received at the material receiving end to be conveyed to the material discharge end; and
a scanning system comprising a scanning device disposed to scan the material being conveyed to the material discharge end and obtain a response from the material from which the material may be classified at least into two classes comprising at least a waste class and a useable ore class based on the response, wherein the scanning system is configured to perform a classification function to classify the material at least into two classes comprising at least a waste class and a useable ore class based on the response of the scanning device;
a chassis supporting the conveyor device and the scanning device;
a transport carriage supporting the chassis and comprising a pair of parallel, driven, ground-engaging tracks so as to be adapted to cause the chassis to be movable across a surface for deployment in use, wherein the pair of parallel, driven, ground-engaging tracks are positioned perpendicular to a longitudinal axis of the chassis; and
wherein the material conveyor apparatus comprises a surge loader, wherein the surge loader is positioned between a material shovel and an onward transportation system, the surge loader being drivable via the pair of parallel, driven, ground-engaging tracks and pivotable via the chassis allowing the surge loader to be positioned optimally to feed the onward transportation system;
the material shovel having a bucket adapted to pick up material and move the material from a work front;
wherein the material conveyor apparatus is positioned to receive material discharged from the bucket into the material receiving end of the material conveyor apparatus and to convey the same to the material discharge end of the material conveyor apparatus; and
wherein the onward transportation system is positioned to receive material from the material discharge end.

23. The system in accordance with claim 22, wherein a separate onward transportation system is provided to receive material classified in each one of the classes separately from material classified in each other of the class, and the apparatus comprises a material sorter in communication with the scanning system, and adapted to physically separate material classified in each one of the classes from material classified in each other of the classes and to distribute material classified in each one of the classes to such respectively separate onward transportation systems.

24. The system in accordance with claim 22, wherein the onward transport system comprises at least one of one or more transport trucks and one or more overland conveyers.

\* \* \* \* \*